United States Patent
Bitton

(10) Patent No.: US 11,171,447 B2
(45) Date of Patent: Nov. 9, 2021

(54) PLUG AND SOCKET ASSEMBLIES THAT OPERATIVELY ASSOCIATE BY WAY OF A SAFETY LOCKING MECHANISM FOR FACILITATING PLUGGING AND UNPLUGGING OF ELECTRICAL FIXTURES

(71) Applicant: Yosef Bitton, Rochester, MN (US)

(72) Inventor: Yosef Bitton, Rochester, MN (US)

( * ) Notice: Subject to any disclaimer, the term of this patent is extended or adjusted under 35 U.S.C. 154(b) by 86 days.

(21) Appl. No.: 16/744,943

(22) Filed: Jan. 16, 2020

(65) Prior Publication Data

US 2020/0235521 A1 Jul. 23, 2020

Related U.S. Application Data

(60) Provisional application No. 62/793,794, filed on Jan. 17, 2019.

(51) Int. Cl.
*H01R 13/627* (2006.01)
*H01R 13/502* (2006.01)
*H01R 33/76* (2006.01)

(52) U.S. Cl.
CPC ....... *H01R 13/6278* (2013.01); *H01R 13/502* (2013.01); *H01R 33/765* (2013.01)

(58) Field of Classification Search
CPC .............. H01R 13/6278; H01R 13/502; H01R 33/765; F21V 23/06; F21V 21/03; H02G 3/20
See application file for complete search history.

(56) References Cited

U.S. PATENT DOCUMENTS

| | | |
|---|---|---|
| 1,916,412 A | 7/1933 | Buchanan |
| 5,145,393 A | 9/1992 | Schoon |
| 5,966,010 A * | 10/1999 | Loy .................. G01R 11/04 324/127 |
| 6,422,903 B1 | 7/2002 | Fekonja et al. |
| 6,908,118 B2 | 6/2005 | Fumioka |
| 7,210,954 B2 | 5/2007 | Ohki et al. |
| 7,265,966 B2 * | 9/2007 | Dudley .................. G01R 1/04 361/659 |
| 7,278,873 B2 | 10/2007 | Langhoff et al. |
| 7,963,792 B2 | 6/2011 | Sawada et al. |
| 8,690,198 B2 | 4/2014 | Saber et al. |
| 8,956,177 B2 | 2/2015 | Warner |
| 9,478,904 B2 | 10/2016 | Ferry |
| 9,484,695 B2 | 11/2016 | Puschnigg et al. |
| 9,579,784 B2 | 2/2017 | Lu et al. |
| 9,948,027 B2 | 4/2018 | Sandwith |
| 10,107,849 B2 | 10/2018 | Jeon |
| 10,906,123 B2 * | 2/2021 | Pike .................. B23K 10/00 |
| 2016/0344138 A1 | 11/2016 | Kazmier |
| 2020/0303093 A1* | 9/2020 | Cantz .................. H01B 7/425 |
| 2020/0358219 A1* | 11/2020 | Pillard ............... H01R 13/642 |

* cited by examiner

*Primary Examiner* — Jean F Duverne
(74) *Attorney, Agent, or Firm* — Dunlap Bennett & Ludwig, PLLC

(57) ABSTRACT

Plug and socket assemblies that operatively associate with a safety locking mechanism to enable plugging and unplugging ceiling and wall electrical fixtures safely and conveniently.

7 Claims, 4 Drawing Sheets

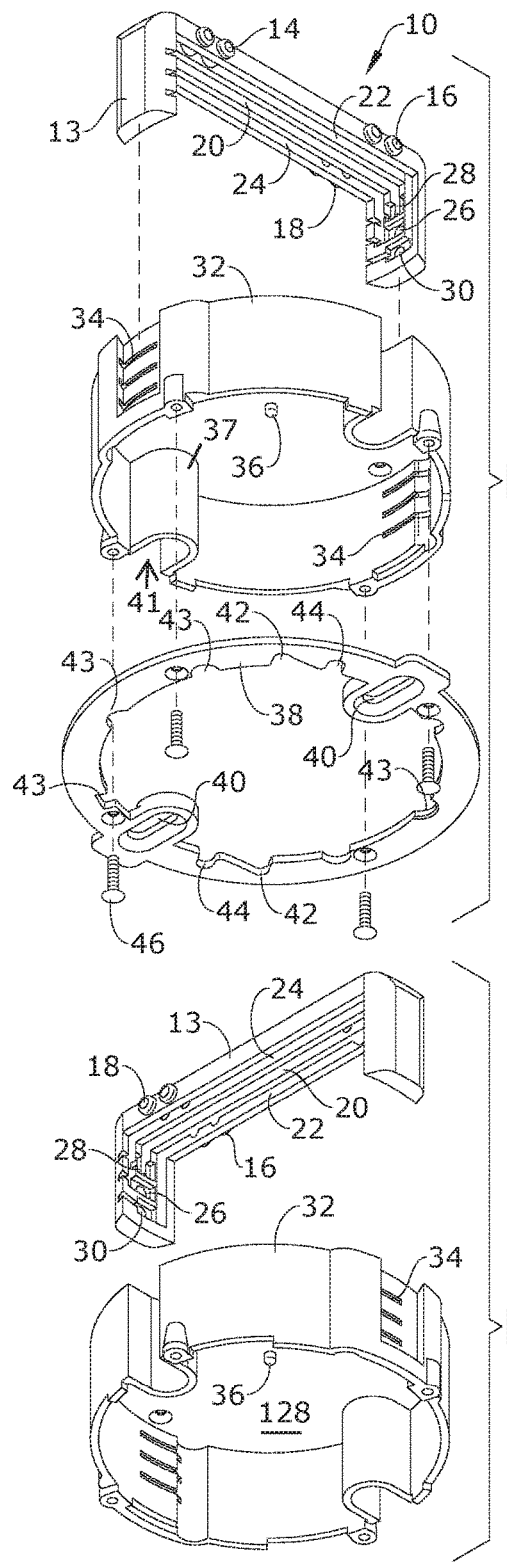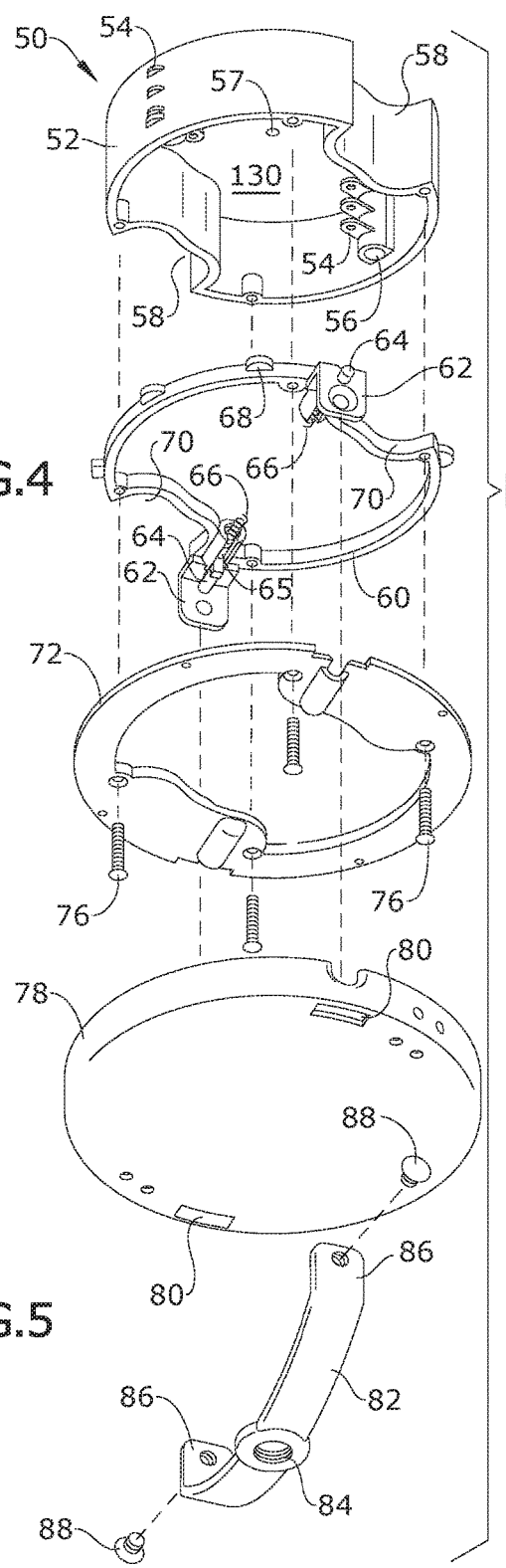

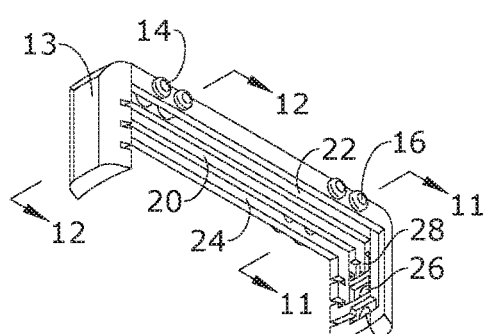
FIG.10
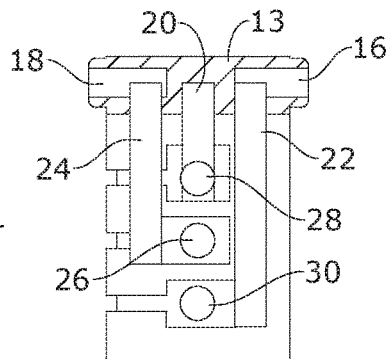
FIG.11
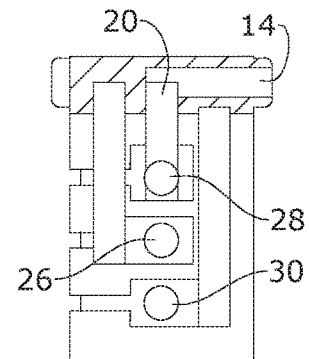
FIG.12
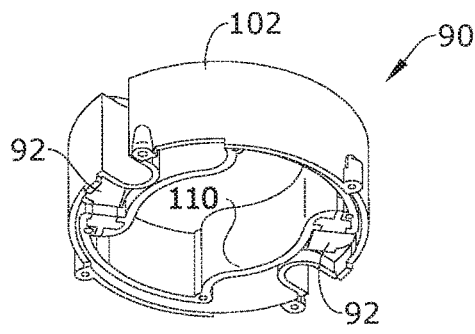
FIG.13
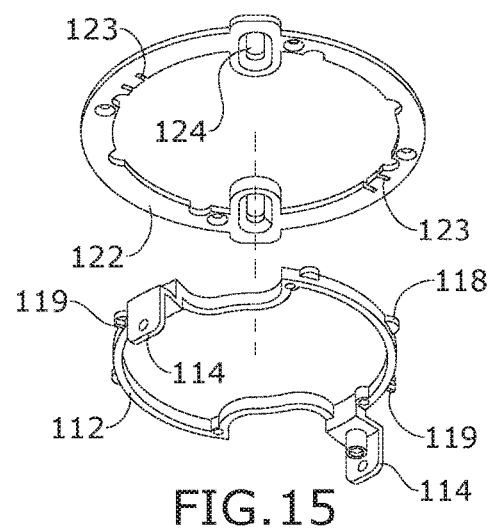
FIG.15
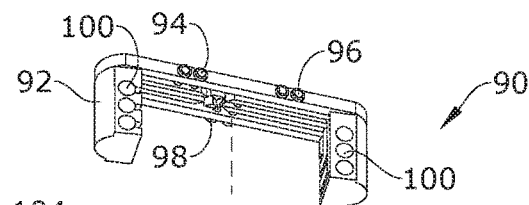
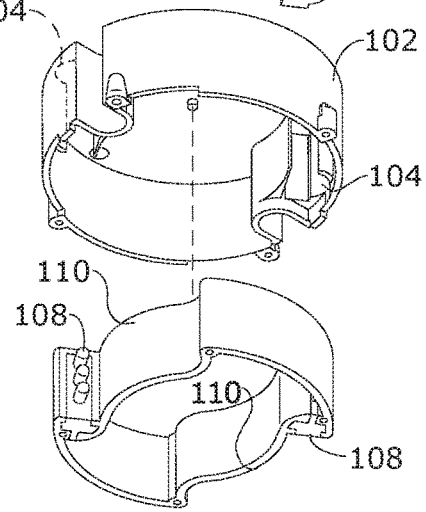
FIG.14
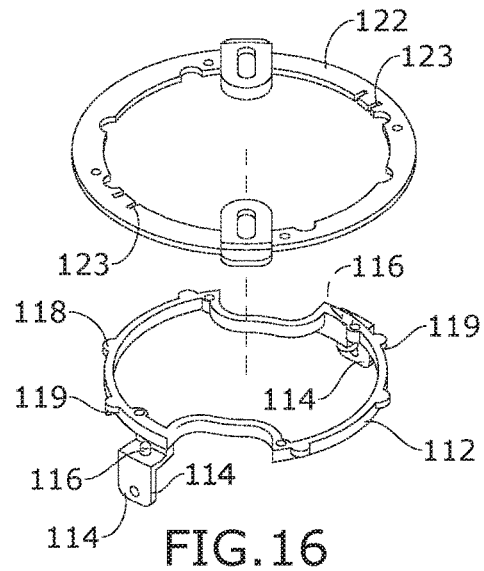
FIG.16

PLUG AND SOCKET ASSEMBLIES THAT OPERATIVELY ASSOCIATE BY WAY OF A SAFETY LOCKING MECHANISM FOR FACILITATING PLUGGING AND UNPLUGGING OF ELECTRICAL FIXTURES

CROSS-REFERENCE TO RELATED APPLICATION

This application claims the benefit of priority of U.S. provisional application No. 62/793,794, filed 17 Jan.2019, the contents of which are herein incorporated by reference.

BACKGROUND OF THE INVENTION

The present invention relates to electrical fixtures and, more particularly, to plug and socket assemblies that operatively associate by way of a safety locking mechanism enabling plugging and unplugging ceiling and wall electrical fixtures safely and conveniently.

Electrical devices such as light fixtures and ceiling fans are not safe to install, connect, and disconnect to electricity by unqualified or untrained individuals; rather, a professionally qualified electrician is required to safely install and uninstall electrical fixtures from ceilings or walls.

The connecting mechanisms of the existing ceiling plug devices use horizontal circular plates and safety lock levers located at the center of the device. The release mechanism is positioned in the center of the two parallel plates which requires pushing the connect/release lever located at the center of the device. In many instances this connector design makes access to the connect/release mechanism harder and inconvenient depending on the type of fixture connected to the connector plug. Furthermore, the current design solution results in the connect release lever located at the center, occupying most of the junction box space, significantly limiting adding electronic components without major alteration of the device size and shape as well as access to the safety lever.

In other words, current electrical fixture connect/release operations require access to a vertical lever located in the middle of the connector which is not always easily accessible. Also, due to the mechanical and electrical design of the connector, it occupies the entire space in the junction box device and therefore such devices do not afford physical space to add features and electronic control components within the connector device itself. Add-on electronic modules and features require external space not available inside the junction box and may not be available outside the device due its size and the connect/release operation mechanism.

As can be seen, there is a need for a plug and socket assemblies that operatively associate with a safety locking mechanism to enable plugging and unplugging ceiling and wall electrical fixtures safely and conveniently.

The socket and plug assembly configuration of the present invention enables users to connect and disconnect electrical fixtures safely and easily much like plugging an appliance to a wall outlet. With the device embodied in the present invention electrical fixtures can be connected, disconnected and relocated to a different spot by simply plugging, unplugging and plugging again safely and easily without requiring any professional installation.

Since the entire safety connect/release mechanism and electrical contact design are located at the peripheral vertical edge of the device, rather than center, it enables convenient access to the safety levers to facilitate moving the plug assembly from locked engagement to an unlocked engagement for release of the plug assembly. Moreover, the device design creates a large centrally disposed space that enables adding a variety of electronic components and devices to add functions and features to the device without the need to modify the operation or modify the shape and size of the connector.

Specifically, a ceiling or wall socket assembly is pre-installed once by a professional electrician, similar to electric wall outlets that are pre-installed in the home or office and are ready to be used. Electrical fixtures such as lights or fans purchased with the matching plug assembly already pre-installed, similar to the standard wall plug in appliances, are simply plugged into the pre-installed socket assembly in the ceiling or wall safely and securely.

The device connecting mechanism of the present invention enables quick and simple plug-in connection and unplug disconnection of electrical fixtures to and from the ceiling or wall. The socket and plug assemblies are designed such that all electrical connectors and locking mechanisms are disposed along a periphery of the device. This peripheral connector and lock design provide the following advantages:

1. Enables the safe and convenient connect and release of electrical fixtures such as lights and fans with easy access to the connecting and releasing safety levers.

2. Affords a hollow space for housing a broad selection of electronic boards and electronic devices for a variety of add-on functions and features that can be housed in the hollow cavity of the plug assembly without altering the device's physical shape or protruding outside the connector device body. Due to the peripheral connect design and safety lock mechanism, the device can be easily resized and reshaped at the top part of the plug assembly cover to enable adding a larger electrical device or multiple electrical devices within the connector plug assembly, such as remote control circuit, variety of sensors for security, temperature, humidity, smoke and fire detectors, microphone, speaker, backup battery, emergency light, security camera, Wi-Fi router or repeater, etc.

3. The peripheral connector design enables adapting the plug and socket assembly configuration to various standard ceiling and wall junction boxes sizes and shapes without significantly altering the electrical connect/disconnect and locking mechanisms and electrical contacts.

SUMMARY OF THE INVENTION

In one aspect of the present invention, a configuration of plug and socket assemblies that operatively associate to enable plugging and unplugging electrical fixtures includes the following: a socket assembly providing the following: a socket housing having a cylindrical shape; and an electrical U-connector having a U-shape, the electrical U-connector providing a plurality electrical connector pins along an inward surface of each leg of the U-shape so when said legs engages an outward surface of the socket housing, a plurality of electric plate slots are electrically coupled to the electrical U-connecter, wherein the plurality of electric plate slots are disposed along an inward surface of the socket housing; and a plug assembly providing the following: a plug housing having a cylindrical shape; a plurality electrical plug connectors along an outward wall of the plug housing; a plug locking plate attached to the plug housing; the plug locking plate providing locking mechanisms along an outward periphery thereof so that the plug housing can be inserted within the sidewalls of the socket housing and move between an unlocked engagement and a locked engagement along an inward surface of the socket housing, wherein the locking engagement the plurality of electrical plug connectors electrically connect to the plurality electrical connector pins; and a plug housing cavity defined by an inward surface of the plug housing sidewalls of the cylindrical shape.

In another aspect of the present invention, a plug and socket configuration for electrical fixtures includes the following: a socket assembly providing a socket sidewall having an outward surface and an inward surface defining a socket housing cavity; and a plug assembly providing the following: a plug sidewall having an outward surface and an inward surface defining a plug housing cavity, wherein the plug sidewall substantially nests in the socket housing cavity in an operatively associated condition; two pluralities of electrical plug connectors extending through the plug sidewall for electrically coupling with a plurality of electrical connector pins outward of the socket sidewall when the plug assembly in the operatively associated configuration is moved to a locked engagement; and one or more spaced apart safety pins attached to and protruding outwardly beyond the outward surface of the plug sidewall for engaging the socket assembly in the locked engagement, wherein the plug assembly can move from the operatively associated condition to an operatively disassociated condition outside the socket housing cavity, whereby the plug housing cavity is devoid of structure; two pluralities of connector plate slots communicating said inward and outward surfaces of the socket sidewall, wherein the two pluralities of electrical plug connectors extend through the two pluralities of connector plate slots in the locked engagement; a ring-shaped plug locking plate attached to the plug sidewall; and a safety lever operatively engaged with each safety pin, wherein the safety lever extends outward beyond a distal end of the safety pin; an electrical U-connector having a U-shape, the electrical U-connector providing a plurality electrical connector pins along an inward surface of each leg of the U-shape, wherein each plurality of connector plate slots align one plurality electrical connector pins, wherein a substantial portion of the outward surface of the plug sidewall is adjacent to the inward surface of the socket sidewall in the operatively associated condition; the plug assembly in the operatively associated condition is rotatable between the locked engagement and an unlocked engagement; a ring-shaped socket lock bracket attached to the socket sidewall; and one or more sets of a first lock pin slot and a second lock pin slot, provided along an inner periphery of the socket lock bracket so that in the unlocked engagement the safety pin is biased in the first lock pin slot, and wherein the locked engagement the safety pin is biased in the second lock pin slot, wherein each safety pin is biased outwardly, and wherein engaging the operatively engaged safety lever unbiases the safety pin; a plurality of tab slots provided along the inner periphery of the socket lock bracket; and a plurality of bracket tabs spaced apart along an outward periphery of the plug locking bracket, wherein the plurality of tab slots and the plurality of bracket tabs align when moving between said operatively associated and operatively disassociated configurations.

These and other features, aspects and advantages of the present invention will become better understood with reference to the following drawings, description and claims.

BRIEF DESCRIPTION OF THE DRAWINGS

FIG. 4 is an exploded view of an exemplary embodiment of the socket assembly 10 of the present invention;

FIG. 5 is a reverse detail exploded view of an exemplary embodiment of an electrical U-connector 13 and a socket housing 32 of the present invention;

FIG. 6 is an exploded view of an exemplary embodiment of the plug assembly 50 of the present invention;

FIG. 10 is a perspective view of an exemplary embodiment of the electrical U-connector 13 of the present invention;

FIG. 11 is a section view of an exemplary embodiment of the present invention, taken along line 11-11 of FIG. 10;

FIG. 12 is a section view of an exemplary embodiment of the present invention, taken along line 12-12 of FIG. 10;

FIG. 13 is a perspective view of an exemplary embodiment of an alternative plug assembly 90 of the present invention;

FIG. 14 is an exploded perspective view of an exemplary embodiment of an alternative plug assembly 90 of the present invention;

FIG. 15 is an exploded perspective view of an exemplary embodiment of a safety lock plug brackets 112 and 122 of the present invention; and FIG. 16 is a reverse exploded perspective view of an exemplary embodiment of the safety lock plug brackets 112 and 122 of the present invention.

DETAILED DESCRIPTION OF THE INVENTION

Figure 1:
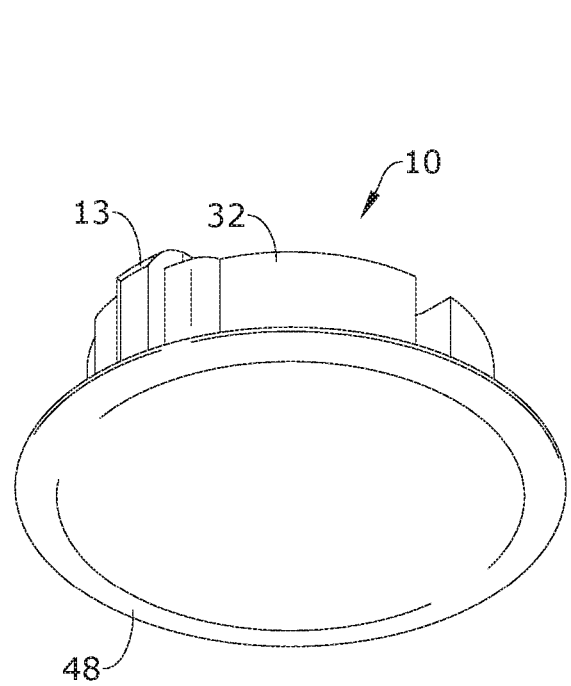
FIG. 1 is a perspective view of an exemplary embodiment of a socket assembly 10 of the present invention with a socket blank cover 48 in place.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides plug and socket assemblies that operatively associate by way of a safety locking mechanism to enable plugging and unplugging ceiling and wall electrical fixtures safely and conveniently.

It should be understood by those skilled in the art that the use of directional terms such as upper, lower, outward, inward, top, left, right and the like are used in relation to the illustrative embodiments as they are depicted in the figures, the outward direction being directed toward the margins of the corresponding figures, while the inward direction is toward an inner portion of the components of the corresponding figures.

Referring to FIGS. 1 through 16, the present invention may include a socket assembly 10 and a compatible plug assembly 50 adapted to operatively and electrically associate with each other at electrical fixtures.

Referring to FIGS. 4 and 5, the socket assembly 10 includes a socket housing 32 that electrically connects with an electrical U-connector 13 and operatively associates with a socket lock bracket 38. The socket assembly 10 may be fastened to the standard junction box replacing the standard electric fixtures metal bracket, wherein the socket assembly 10 may include the electrical contacts and the metal ring that carries the weight of the fixture and safely locks it in place.

The electrical U-connector 13 may be generally U-shaped having an outward surface and inward surface, wherein the outward surface corresponds to "outward" portions of the U-shape, while the inward surface corresponds to "inward" portions of the U-shape. The U-connector 13 may have a base portion and two spaced apart leg portions that also correspond to the U-shape. The U-connector 13 may provide a plurality of wire tracks along an inward surface of the base portion, for example a first wire track 20, a second wire track 22, and a third wire track 24. Each wire track 20, 22, and 24 continues down the inward surface of the leg portions until terminating and operatively associating at a first connector pin slot 26, a second connector pin slot 28, a third connector pin slot 30, respectively. Along the outward surface of the base, a first wire ports 14, a second wire ports 16, and a third wire ports 18 electrically connected to the wire track 20, 22, and 24, respectively. The above-mentioned electrically and mechanical connections are illustrated further in FIGS. 10-12, wherein the two sets of connector pin slots 26, 28, and 30 may be metal electric contacts Live, Neutral and Ground (L, N, and G) electrically connecting external wires from the standard junction box by way of the three pairs of IN/OUT external wire ports 14, 16, and 18, respectively, enabling junction electric wires reliable continuation through the electric U-Connector 13 without any additional wire connectors.

The socket housing 32 provides a generally cylindrical sidewall closed off on one end by a base plate, while the other end is open, communicating to a socket housing cavity 128 defined by the base plate and the generally cylindrical sidewall. The socket housing 32 may generally have an ashtray-shape that includes an outward surface and an inward surface corresponding to the outward and inward surfaces, respectively, of the ashtray-shape. The base plate may provide an alignment post 36 along an inward surface thereof. The outward surface of the sidewall may provide a pair of diametrically opposed plurality of connector plate slots 34 dimensioned and adapted to slidably receive and electrically coupled to the inward surface of the leg portions of the U-connector 13. The plurality of connector plate slots 34 may communicate to the inward surface of the sidewall. The sidewall may provide two diametrically opposed semi-oval inward extending j-box connection protrusion 37, each defining a sidewall j-box connection slot 41.

It should be understood that the application routinely refers to 'diametrically opposing' components, as illustrated in the FIGS., that there are embodiments contemplated by the present invention where the components may be spaced apart from each other but not necessarily 'diametrically opposed'.

The socket lock bracket 38 may be a ring-shaped plate providing a pair of diametrically opposing j-box connection slots 40 that align with the sidewall j-box connection slots 41 when the socket lock bracket 38 is joined to a periphery of the open end of the socket housing 32 by way of fasteners 46. The inner periphery of the socket lock bracket 38 may provide at least of a first lock pin slot 42 and a second lock pin slot 44 for facilitating a locked engagement with the plug assembly 50 or 90. The inner periphery of the socket lock bracket 30 may also provide a plurality of spaced apart tab slots 43 for facilitating the operative association of the socket assembly and the plug assembly 50.

Referring to FIG. 6, the plug assembly 50 includes a plug housing 52 that operatively associates with a plug locking bracket 69, a plug bracket cover 72, and plug cover 78. The plug assembly 50 plugs into the socket assembly 10 and includes the electrical contacts 54 to form an electrical connection through the plurality of connector plate slots 34 along the inward surface of the socket housing 32 sidewall, when the locking engagement is secured with the socket lock bracket 38.

The plug housing 52 provides a generally cylindrical sidewall closed off on one end by a base plate, while the other end is open, communicating to a plug housing cavity 130 defined by the base plate and the generally cylindrical sidewall. The plug housing 52 may generally have an ashtray-shape that includes an outward surface corresponding to an outward surface of the ashtray-shape and an inward surface corresponding to an outward surface of the ashtray-shape. The base plate may provide, along an inward surface thereof, an alignment hole 57 that aligns with said alignment post 36 when the socket assembly 10 and the plug assembly 50 are operatively associated. The outward surface of the sidewall may provide a pair of diametrically opposed lock rotation slots 58 to facilitate the plug assembly 50 moving relative to the socket assembly between an unlocked engagement and the locked engagement.

Along an inward surface of the sidewall may be diametrically opposed plate pins 56, each providing a plurality of connector plates 54 that extend into the plug housing cavity 130 as well as extend outside the outward surface of the sidewall. The outward-facing plurality of connector plates 54 are dimensioned and adapted to slide through the plurality of connector plate slots 34 along the inward surface of the socket housing 32 sidewall when the plug assembly 50 moves to the locked engagement, whereby the connector plates 54 electrically couple (through the plurality of connector plate slots 34) to the connector pin slots 26, 28, and 30 (L, N, and G) of the electrical U-connector 13.

The plug locking bracket 60 may be a ring-shaped plate providing a plurality of bracket tabs 68 along an outward periphery thereof so that the plurality of bracket tabs 68 align with the tab slots 43 along the socket lock plate 38 when the plug assembly 50 operatively associates or dissociates with the socket assembly 10—or in other words, when the plug assembly 50 "plugs in" to the socket assembly 10 (operative association) or operatively disassociates ("unplugs") from the socket assembly 10.

Figures 8, 9:
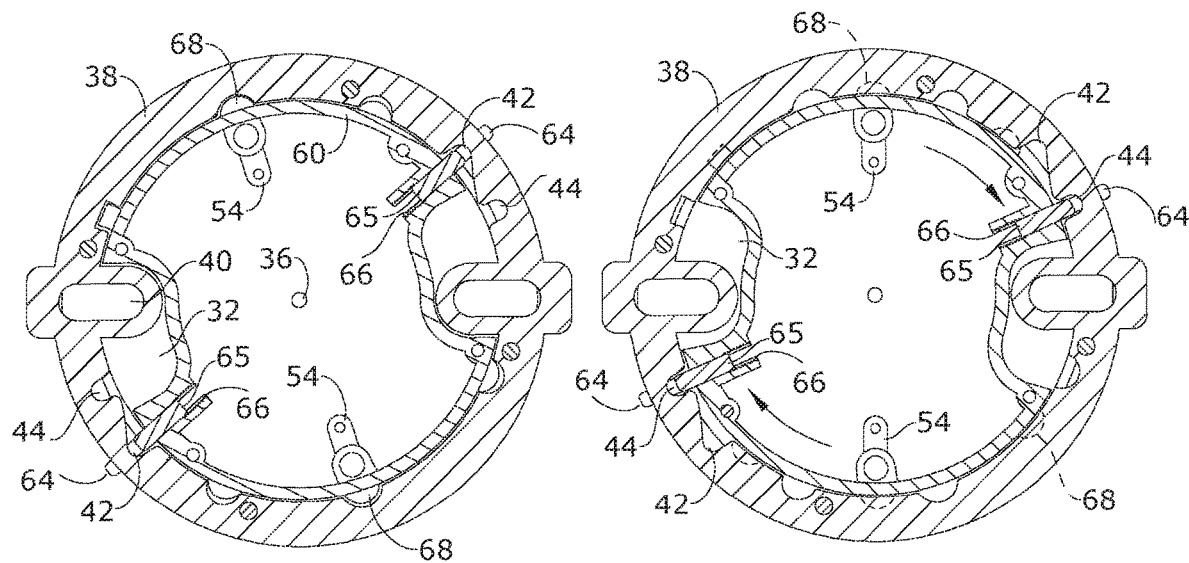
FIG. 8 is a section view of an exemplary embodiment of the present invention, invention, taken along line 8-8 of FIG. 7 with the plug assembly 50 in an unlocked engagement.
FIG. 9 is a section view of an exemplary embodiment of the present invention, illustrating the rotation of the plug assembly 50 into the locked engagement.

A pair of diametrically opposing lock rotation slots 70 are provided along the ring-shaped plate to align with the pair of diametrically opposed lock rotation slots 58 along the plug housing 52 when the two are joined. Furthermore, the j-box connection slots 40 and their defining structure of the socket lock plate 38 are disposed, at least in part, with a cavity defined by the lock rotation slots 58 and 70. The lower periphery of the plug locking bracket 60 may provide diametrically opposing safety pins 65 that extend outside of the outward periphery of the plug locking bracket 60. A spring 66 spring-loads each safety pins 65 urging them to protrude outwardly. In the operatively associated condition and the unlocked engagement, the safety pins 65 are disposed in the first lock pin slots 42. When the plug assembly 50 is moved to the locked engagement, by rotating within the socket housing cavity 128, the safety pins 65 move from the first lock pin slots 42 to the second lock pin slots 44 as illustrated in FIG. 8 (unlocked engagement) and FIG. 9 (locked engagement) along an inward periphery of the socket lock bracket 38. A pair of joined safety release lever 64 and safety pin 65 illustrated in plug locking bracket 60 of FIG. 6 are engaged with each spring 66 so that depressing of the safety release lever 64 unbiases the safety pins 65 so that the plug assembly 50 can be rotated to the unlocked engagement prior to operative disassociation. In certain embodiments, the safety pin 65 and associated release lever 64 are statically connected so that they move together. Each safety pin 65 may be provided on a distal end of biasing spring 66. By locked engagement, in essence, the two spring-loaded locking pin 65 enables the plug locking bracket 60 to lock into the socket lock bracket 38 (by way of the second lock pin slots 44) to safely connect the electrical fixture as well as safely and securely carry the weight of the electrical fixture and lock it in place. The plug locking bracket 60 attaches to the plug housing 52 and locks with the socket lock bracket 38 when inserted and turned clockwise.

The lower periphery of the plug locking bracket 60 may provide diametrically opposing bridge connection tabs 62 for connecting a bridge 82.

The plug bracket cover 72 may be dimensioned and adapted to provide a cover to the locking bracket 60 together with the safety pins 65, springs 66 and safety release levers 64. The plug locking bracket 60, the plug bracket cover 72 and the plug housing cavity 130 are joined through a plurality of fasteners 76.

Figure 2:
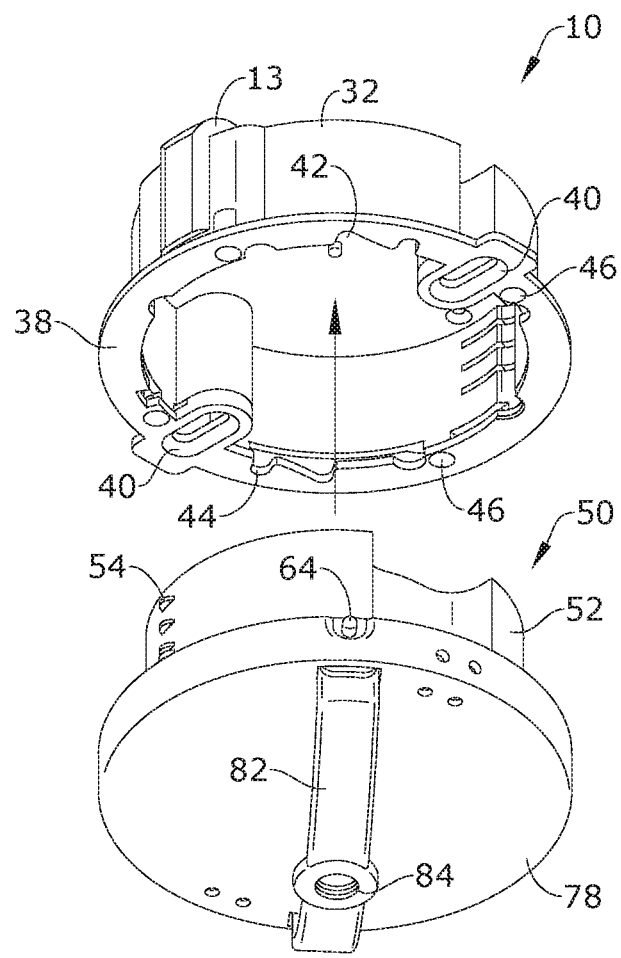
FIG. 2 is a perspective view of an exemplary embodiment of the socket assembly 10 of the present invention with the socket blank cover 48 removed, illustrating the insertion of a plug assembly 50.
Figure 3:
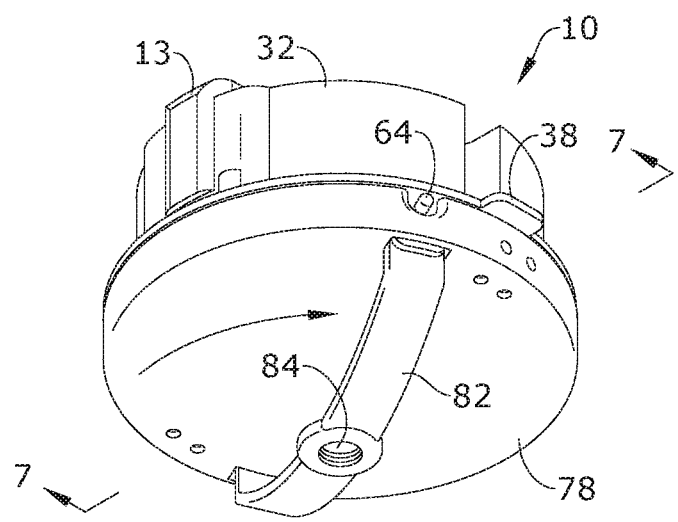
FIG. 3 is a perspective view of an exemplary embodiment of the plug assembly 50 inserted into the socket assembly 10, illustrating a rotation for moving the plug and socket assemblies 50 and 10 into a locked engagement.
Figure 7:
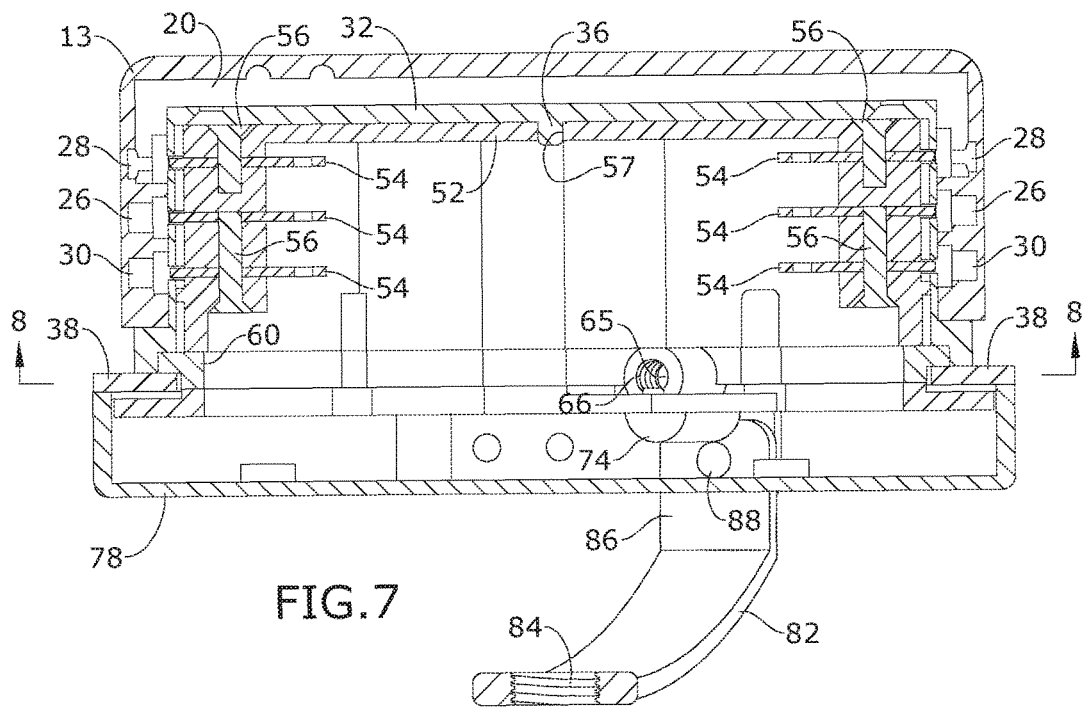
FIG. 7 is a section view of an exemplary embodiment of the present invention, taken along line 7-7 of FIG. 3.

The plug cover 78 may be dimensioned and adapted to cover the operatively associated plug locking bracket 60, the plug bracket cover 72 and the plug housing cavity 130. The plug cover 78 may provide peripheral cutouts 81 dimensioned and adapted to receive spring biased release lever 64 in the locked engagement, as illustrated in FIGS. 2 and 3. The plug cover 78 may provide diametrically opposing bridge arm slots 80 for receiving either end of a bridge 82. The bridge 82 may provide opposing bridge arms 86 for operatively engaging arm fasteners 88 that join to each bridge connection tabs 62. The bridge 82 may provide a centrally disposed threaded hole 84.

By locked engagement, in essence, the two spring-loaded locking pin 65 enables the plug locking bracket 60 to lock into the socket lock bracket 38 (by way of the second lock pin slots 44) to safely connect the electrical fixture as well as safely and securely carry the weight of the electrical fixture and lock it in place. The plug locking bracket 60 attaches to the plug housing 52 and locks with the socket lock bracket 38 when inserted and turned clockwise.

The plug bracket cover 72 and the plug cover 78 connect to the plug locking bracket 60 and the plug housing 52 providing the connector plates 54 for electrically connecting to the fixture's electrical wires with room for additional electronic components within the plug housing cavity 130 defined by the plug housing 52. The plug locking bracket 60 provides standard fixture thread nipple and fasteners to connect the plug locking bracket 60 to the electrical fixture. The plug bracket cover 72 connects to the socket lock bracket 38 and the socket housing 32 to be used as a cover for the socket assembly 10 opening and junction box when the socket is not in use.

The OUT contacts of the wire ports 14, 16, and 18 are provided for convenience and safety so the wires (L, N, and G) can safely and reliably extend from one junction box to another junction box. The socket lock bracket 38 is attached to the socket housing 32 with the electrical U-connector 13 to form the complete socket assembly 10. The plug assembly is formed by assembling the plug housing 52 that make electric contacts with the socket assembly 10 when inserted and locked. This container has two sets of identical electric contacts (L, N, and G) to make electric contact with the electrical U-connector 13 in the socket with matching electric contacts (L, N, G). The reason for two identical electric connector sets on both sides of the electrical U-connector 13 and the plug housing 52 is that the user can insert the plug assembly 50 into socket assembly 10 in any of the two possible ways without worrying about the correct orientation of the plug assembly 50. The plug locking bracket 60 with lock and release mechanisms on each side is attached to the plug housing 52. It locks with the socket lock bracket 38 when inserted and turned clockwise. As shown in the FIGS., the plug locking bracket 60 has two lock and release spring-loaded mechanisms with safety pins 65 and side levers 64 for easy access to lock when fixture is inserted and unlock to remove fixture. The plug bracket cover 72 and the cover 78 in are connected to the plug housing 52 and the plug locking bracket 60 with fasteners to form the complete plug assembly 50. The bridge bracket 82 is connected to the plug locking bracket 60 with two fasteners. The bridge bracket 82 can be designed and modified to various shapes and sizes to fit various electrical fixtures such as lights, fans, etc.

In certain embodiments, a socket blank cover 48 may be provided for the socket assembly 10 when it is not in use. The socket blank cover 48 connects to the socket lock bracket 38 of the socket assembly 10 in the junction box to cover the socket assembly 10 opening and the junction box when not in use.

An alternate electrical contact design based on "bullet" socket electrical contacts and modifications to three parts are illustrated in FIGS. 13-14. The alternative electrical U-connector 92 may be modified to have two sets of L, N, G contact sockets/pin holes 100 and the same three electrically connected In/Out wire ports 94,96,98 as before. The socket housing 102 shape may be modified to accept this alternative electrical U-connector 92. The plug housing 110 is modified to house two sets of bullet electrical contacts 108. Assembly 90 shows that when plug 110 is inserted into the socket 102 and turned clockwise to make the electrical contact.

The safety locking mechanism can be modified in another way so that locking and releasing the plug does not require direct access to lock the plug in the socket or release the plug from the socket. As shown in FIGS. 15-16, both socket lock bracket 122 and the plug locking bracket 112 are modified. The plug locking bracket 112 is modified with added static safety pins 119 that are built on top of the bracket tabs 118. A pair of vertical spring-loaded pins 116 are added to the plug locking bracket 112. The plug locking bracket 112 may be modified to match the bracket tabs 118 with statics pins 119. With this design there is no need for side safety pins and release levers. When the user inserts the plug into the socket and turns it clockwise the static pins 119 are inserted to the slots 123 of socket lock bracket 122 and the spring-loaded pins 116 ensures the plug stays secure in place. To release the user pushed the plug assembly upwards to release the static pins 119 and turns plug counterclockwise to release from socket.

The cover 78 can be modified in various sizes and shapes without affecting the overall socket and plug design to house various electronic boards, sensors, and devices. An LED indicator light can be added and placed on the cover 78 to indicate to the user that the Connector device is inserted and connected properly. The LED light will only come on after the plug is inserted, turned and locked and the device has made electrical contacts to indicate the device is operational.

A method of using the present invention may include the following. The socket assembly 10 and the plug assembly 50 or 90 may be providing. The socket assembly 10 may be preinstalled by a qualified electrician similar to a wall outlet and is ready to connect to any fixture that is equipped with the matching plug assembly 50 or 90. Therefore, to connect an electrical fixture to any socket assembly 10 in the house or office, one simply inserts the fixture with preinstalled plug assemblies 50 or 80, depresses the safety locking levers 64, rotates the plug assembly 50 or 90 clockwise, and release the locks levers to secure the locked engagement. The electrical fixture is now safely connected and operational much like plugging an appliance to a wall outlet. To disconnect, the user simply unplugs the fixture by pressing in the plug assembly safety locking levers 64, rotating the connector plug assembly 50 and 90 counterclockwise, and unplugging the electrical fixture from the socket assembly 10.

The plug housing cavity 130 defined by the inward surface of the sidewalls of the plug housing 52 is dimensioned and adapted to house various electronic boards, sensors and devices to function as variety of home and office systems. examples of these systems are: communication systems (wi-fi, routers, and repeaters); a security system (motion sensors, microphone, camera, speaker, alarm); a sound system (speakers, microphones); a safety system (smoke and fire detectors with alarm); a comfort systems (humidity and temperature sensors, light sensors); an emergency system (emergency lights and backup battery); as well as a variety of added features housed in the plug connector cavities 130 and cover 78 can function with an electrical fixture or without an electrical fixture as standalone ceiling and wall devices.

It should be understood, of course, that the foregoing relates to exemplary embodiments of the invention and that modifications may be made without departing from the spirit and scope of the invention as set forth in the following claims.

What is claimed is:

1. A plug and socket configuration for electrical fixtures, comprising:
   a socket assembly comprising:
      a socket sidewall having an outward surface and an inward surface defining a socket housing cavity; and
   a plug assembly comprising:
      a plug sidewall having an outward surface and an inward surface defining a plug housing cavity, wherein the plug sidewall substantially nests in the socket housing cavity in an operatively associated condition;
      two pluralities of electrical plug connectors extending through the plug sidewall for electrically coupling with a plurality of electrical connector pins outward of the socket sidewall when the plug assembly in the operatively associated configuration is moved to a locked engagement;
      one or more spaced apart safety pins attached to and protruding outwardly beyond the outward surface of the plug sidewall for engaging the socket assembly in the locked engagement,
      wherein the plug assembly can move from the operatively associated condition to an operatively disassociated condition outside the socket housing cavity, whereby the plug housing cavity is devoid of structures;
      two pluralities of connector plate slots communicating said inward and outward surfaces of the socket sidewall,
      wherein the two pluralities of electrical plug connectors extend through the two pluralities of connector plate slots in the locked engagement;
      a ring-shaped plug locking plate attached to the plug sidewall; and
      a safety lever operatively engaged with each safety pin, wherein the safety lever extends outward beyond a distal end of the safety pin.

2. The plug and socket configuration for electrical fixtures of claim 1, further comprising:
   an electrical U-connector having a U-shape, the electrical U-connector providing a plurality electrical connector pins along an inward surface of each leg of the U-shape, wherein each plurality of connector plate slots align one plurality electrical connector pins.

3. The plug and socket configuration for electrical fixtures of claim 2, wherein a substantial portion of the outward surface of the plug sidewall is adjacent to the inward surface of the socket sidewall in the operatively associated condition.

4. The plug and socket configuration for electrical fixtures of claim 3, further comprising:
   the plug assembly in the operatively associated condition is rotatable between the locked engagement and an unlocked engagement.

5. The plug and socket configuration for electrical fixtures of claim 4, further comprising:
   a ring-shaped socket lock bracket attached to the socket sidewall; and
   one or more sets of a first lock pin slot and a second lock pin slot, provided along an inner periphery of the socket lock bracket so that in the unlocked engagement the safety pin is biased in the first lock pin slot, and wherein the locked engagement the safety pin is biased in the second lock pin slot.

6. The plug and socket configuration for electrical fixtures of claim 5, wherein
   each safety pin is biased outwardly, and wherein engaging the operatively engaged safety lever unbiases the safety pin.

7. The plug and socket configuration for electrical fixtures of claim 6, further comprising:
   a plurality of tab slots provided along the inner periphery of the socket lock bracket; and
   a plurality of bracket tabs spaced apart along an outward periphery of the plug locking bracket,
   wherein the plurality of tab slots and the plurality of bracket tabs align when moving between said operatively associated and operatively disassociated configurations.

* * * * *